US012692175B2

(12) United States Patent　　　　(10) Patent No.:　US 12,692,175 B2

Jenkins et al.　　　　　　　　　　　　(45) Date of Patent:　　　Jul. 28, 2026

(54) METHOD FOR UTILIZING MULTIPLE SIMULTANEOUS INDEPENDENT SOURCES OF WATER IN A COOLING TOWER

(71) Applicant: ECOLAB USA INC., St. Paul, MN (US)

(72) Inventors: Brian V. Jenkins, Wheaton, IL (US); Craig W. Myers, Lisle, IL (US); Daniel L. Legereit, Driftwood, TX (US); Emily Ann Taylor, St. Augustine, FL (US); F. Philip Yu, Mount Royal, NJ (US); Bryan M. Bailiff, Leander, TX (US); Michael R. Fisher, New Lenox, IL (US); Bradley R. Goins, Beaumont, TX (US)

(73) Assignee: ECOLAB USA Inc., St. Paul, MN (US)

( * ) Notice: Subject to any disclaimer, the term of this patent is extended or adjusted under 35 U.S.C. 154(b) by 693 days.

(21) Appl. No.: 17/095,663

(22) Filed: Nov. 11, 2020

(65) Prior Publication Data

US 2022/0144666 A1　　May 12, 2022

(51) Int. Cl.
　　C02F 1/00　　　　(2023.01)
　　C02F 1/50　　　　(2023.01)
　　　　　　(Continued)

(52) U.S. Cl.
　　CPC .............. C02F 1/008 (2013.01); C02F 1/50 (2013.01); C02F 5/08 (2013.01); F28C 1/00 (2013.01);
　　　　　　(Continued)

(58) Field of Classification Search
　　CPC .... C02F 1/008; C02F 1/50; C02F 5/08; C02F 2103/023; C02F 2209/05; C02F 2209/40;
　　　　　　(Continued)

(56) References Cited

U.S. PATENT DOCUMENTS 3,918,469 A　　11/1975　Zamboni et al.
4,460,008 A　*　7/1984　O'Leary ................ G05D 21/02
　　　　　　　　　　　　　　　137/5

(Continued)

FOREIGN PATENT DOCUMENTS

CN　　　　112723609 A　　　4/2021
EP　　　　0113567 A1 †　7/1984

(Continued)

OTHER PUBLICATIONS

Schub, P. et al. "Experience with a Plant for the Treatment of Cooling Tower Make-up Water," (Erfahrungen mit einer Anlage zur Aufbereitung von Kuhlturm-Zusatzwasser). VGB-Kraftwerkstechnik, 63(3), Mar. 1983, pp. 243-245; Language: German; with English Abstract.

(Continued)

*Primary Examiner* — Charles S Bushey
(74) *Attorney, Agent, or Firm* — Eric D. Babych; Barnes & Thornburg LLP

(57)　　　　ABSTRACT

A cooling tower system is disclosed. The cooling system includes a cooling tower; at least two make-up water inlet streams configured to supply water to the cooling tower; a blowdown stream configured to remove water from the cooling tower; at least one sensor monitoring water in each of the make-up water inlet streams; and a controller operably connected to the at least one sensor.

16 Claims, 5 Drawing Sheets

(51) Int. Cl.
| | |
|---|---|
| *C02F 5/08* | (2023.01) |
| *F28C 1/00* | (2006.01) |
| *C02F 103/02* | (2006.01) |

(52) U.S. Cl.
CPC .... *C02F 2103/023* (2013.01); *C02F 2209/05* (2013.01); *C02F 2209/40* (2013.01); *C02F 2303/20* (2013.01); *F28C 2001/006* (2013.01)

(58) Field of Classification Search
CPC ... C02F 2303/20; F28C 1/00; F28C 2001/006
See application file for complete search history.

(56) References Cited

U.S. PATENT DOCUMENTS

| | | | | |
|---|---|---|---|---|
| 4,464,315 A | * | 8/1984 | O'Leary | G05D 21/02 137/5 |
| 4,648,043 A | * | 3/1987 | O'Leary | B01F 35/82 700/285 |
| 4,659,459 A | * | 4/1987 | O'Leary | B01J 4/008 210/96.1 |
| 4,931,187 A | * | 6/1990 | Derham | C02F 5/02 700/282 |
| 5,114,571 A | * | 5/1992 | Pier | C02F 1/38 204/DIG. 5 |
| 5,751,599 A | | 5/1998 | Bortnik et al. | |
| 6,068,012 A | | 5/2000 | Beardwood et al. | |
| 2011/0027803 A1 | | 2/2011 | Moussavi et al. | |
| 2015/0284275 A1 | * | 10/2015 | Ongeche | C02F 1/4602 205/742 |
| 2015/0284276 A1 | * | 10/2015 | Ongeche | C02F 1/4602 210/663 |
| 2016/0096742 A1 | | 4/2016 | Mori et al. | |
| 2017/0082591 A1 | | 3/2017 | Mori et al. | |
| 2017/0297929 A1 | | 10/2017 | Whitaker et al. | |
| 2018/0186656 A1 | | 7/2018 | Drewniak et al. | |
| 2018/0224174 A1 | | 8/2018 | Hollander et al. | |
| 2019/0079064 A1 | | 3/2019 | Jenkins | |
| 2019/0084841 A1 | | 3/2019 | Prakash et al. | |
| 2019/0145722 A1 | | 5/2019 | Myers et al. | |
| 2020/0172409 A1 | | 6/2020 | Trujillo | |

FOREIGN PATENT DOCUMENTS

| | | | | |
|---|---|---|---|---|
| EP | 3361200 | A1 | | 8/2018 |
| JP | H02115697 | A | | 4/1990 |
| JP | H07151491 | A | | 6/1995 |
| JP | 2003256029 | A | | 9/2003 |
| JP | 2005539196 | A | | 12/2005 |
| JP | 2009030936 | A | | 2/2009 |
| JP | 2011083684 | A | | 4/2011 |
| JP | 2011203031 | A | † | 10/2011 |
| KR | 20190139457 | A | | 12/2019 |
| WO | 2004028978 | A1 | | 4/2004 |
| WO | 2008151377 | A1 | | 12/2008 |
| WO | 2020097705 | A1 | | 5/2020 |

OTHER PUBLICATIONS

PCT International Search Report and Written Opinion for PCT/US2020/060055, mailed Aug. 2, 2021, 13 pages.

\* cited by examiner
† cited by third party

METHOD FOR UTILIZING MULTIPLE SIMULTANEOUS INDEPENDENT SOURCES OF WATER IN A COOLING TOWER

BACKGROUND

1. Field of the Invention

The present disclosure generally relates to controlling and monitoring make-up water for cooling towers. More particularly the disclosure relates to a method of utilizing independent sources of make-up water simultaneously.

2. Description of the Related Art

Water cooling towers are used in large capacity heat exchange systems, such as those found in oil refineries and chemical production plants. Cooling towers are used to remove absorbed heat from a circulating water coolant by evaporating a portion of the coolant in the cooling tower. The remaining coolant can be extracted from a reservoir or sump at the base of the tower by a pump, and supplied through the heat load on a continuous basis. Because a large quantity of water evaporates in such a system, scale, silt, or other water contaminants may build up in the recirculating water over time.

To help prevent or limit the extent to which fouling occurs on surfaces contacted by the recirculating cooling water, various chemicals may be added to the cooling water. In a typical operating environment, a technician may take samples of cooling water from the cooling water system and perform chemical analysis on the samples. The technician may adjust the type of chemical added to the cooling water based on the analysis. Oftentimes, the technician may only be onsite at the facility to perform cooling water analysis on a limited basis, such as once a week or once a month. As a result, changes in facility process conditions may not be detected until sometime after the process conditions have altered. Moreover, even where cooling water chemistry is changed to account for changed process conditions, such charges are generally reactionary rather than predictive changes to prevent undesirable cooling water conditions.

BRIEF SUMMARY

A cooling tower system is disclosed. The cooling system includes a cooling tower; at least two make-up water inlet streams configured to supply water to the cooling tower; a blowdown stream configured to remove water from the cooling tower; at least one sensor monitoring water in each of the make-up water inlet streams; and a controller operably connected to the at least one sensor.

In some aspects, the at least two make-up water inlet streams comprises three make-up water inlet streams.

In some aspects, the at least two make-up water inlet streams are connected to a pipe that is connected to the cooling tower, and the pipe carries water from the at least two make-up water inlet streams into the cooling tower.

In some aspects, the at least one sensor is a conductivity sensor.

In some aspects, the at least one sensor is a flow sensor.

In some aspects, each make-up water inlet stream is monitored by at least two sensors.

In some aspects, the at least two sensors are a conductivity sensor and a flow sensor.

In some aspects, the controller stores a conductivity set-point.

In some aspects, the cooling water system further includes a distributed control system operably connected to the controller.

In some aspects, the system does not include a make-up water holding tank configured to supply water to the cooling tower.

A method of controlling cooling water treatment is also provided. The method includes receiving data from at least one sensor monitoring water in at least two make-up water inlet streams configured to supply water to a cooling tower; and creating a virtual make-up stream from the data received from the at least one sensor.

In some aspects, data is received from at least three sensors monitoring water in three make-up water inlet streams.

In some aspects, the method includes dosing a chemical additive into the cooling tower based on properties of the virtual make-up stream.

In some aspects, the method includes adjusting blowdown based on properties of the virtual make-up stream.

In some aspects, the method includes monitoring copper and/or mild steel corrosion rate in the make-up water inlet streams.

In some aspects, the chemical additive is selected from the group consisting of a scale inhibitor, a corrosion inhibitor, a biocide, a dispersant, and any combination thereof.

In some aspects, the method includes adjusting a ratio of make-up water in a first stream to make-up water in a second stream.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
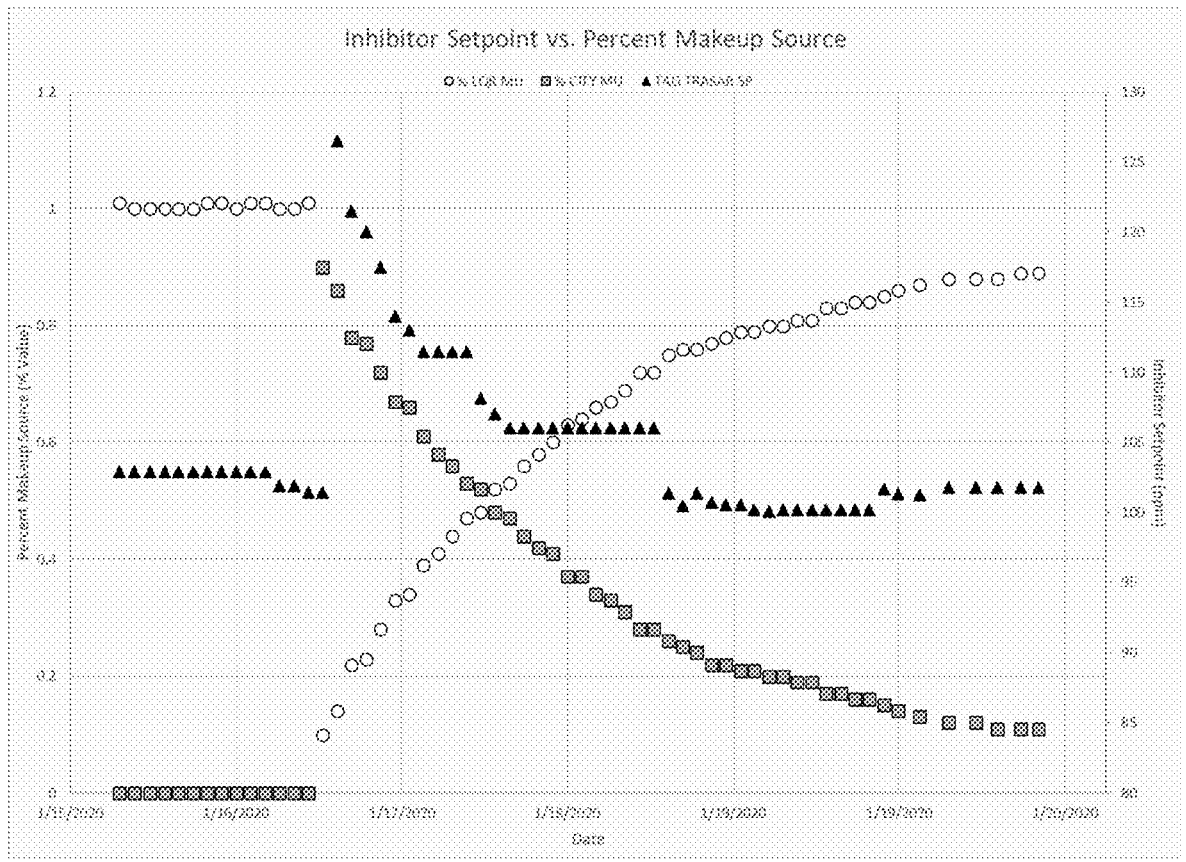
FIG. 1 shows inhibitor setpoint versus percent make-up source.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

Normally, in a multiple make-up source scenario, the only practical alternative for the customer is to install a large equalization tank and direct all the make-up streams to that tank. In that scenario, only one water stream, originating from the tank, is then used as the cooling tower make-up. This application requires a large expenditure of capital, and a large footprint for the tank. Also, this tank does not allow a plant to account for how each of the contributing streams could affect the composite make-up stream.

This present disclosure enables the monitoring of the individual streams without the need for an equalization tank. It also enables real-time changing of the set point of the corrosion/scale control chemistry as the ratios of the multiple streams entering the cooling tower change.

A cooling tower system is disclosed. The cooling system includes a cooling tower; at least two make-up water inlet streams configured to supply water to the cooling tower; a blowdown stream configured to remove water from the cooling tower; at least one sensor monitoring water in each of the make-up water inlet streams; and a controller operably connected to the at least one sensor.

Each make-up water inlet stream may have one sensor, two sensors, three sensors, four sensors, five sensors, or six sensors that monitor the make-up water. The sensors may be configured to detect a variety of properties of the make-up water. Examples of properties measured by the sensors include, but are not limited to, ORP, dissolved oxygen (DO), conductivity, pH, turbidity, concentrations of certain chemicals, such as biocides, scale inhibitors, friction reducers, acids, bases, and/or oxygen scavengers, levels of ions (phosphate) (e.g., determined empirically, automatically, fluorescently, electrochemically, colorimetrically, measured directly, calculated), temperature, pressure, flow rate, or total dissolved or suspended solids.

In some aspects, the at least one sensor is a flow sensor. In some aspects, there are two sensors monitoring each make-up line, a flow sensor and a conductivity sensor.

As another example, a sensor may be an optical sensor to provide a measurement indicative of a concentration and/or size of particles in the cooling water. For example, an optical sensor may be used to measure the turbidity and/or light scatting characteristics of the cooling water. An increased concentration of particulate in the cooling water may be associated with scaling fouling constituents, suggesting a scale fouling mechanism. Additionally or alternatively, an optical sensor may be used to measure fouling formation on a surface of the cooling water stream-side of heat exchanger or an analogue thereof, such as a metal coupon or test strip exposed to the same cooling water conditions the heat exchanger is exposed to. The optical sensor may optically evaluate the foulant formed on the surface being monitored to determine the characteristics of the foulant and, correspondingly, whether the foulant is associated with a scale fouling mechanism (or corrosion or biofouling).

Corrosion rates may be monitored in the make-up water lines and in the cooling tower. The cooling tower system may include corrosion monitoring technology for copper and mild steel to each stream, and use that information to help avoid possible downstream corrosion problems in the cooling tower in real-time. This is especially important in applications involving high-efficiency chillers, as these usually have thinner tube walls in the heat exchangers, requiring more vigilant monitoring of corrosion levels.

As another example, in situations where a chemical additive is introduced into the cooling water stream to counteract a potential fouling cause, the additive may include a fluorescently tagged polymer or inert fluorescent tracer that can be fluorometrically analyzed to determine a concentration of the chemical in the cooling water. A controller may evaluate the consumption rate of the chemical additive based on fluorometric response to help determine whether the detected cooling water fouling is associated with a fouling mechanism being treated or is potentially a different fouling mechanism.

As used herein, the term "scale fouling" refers to fouling of a heat exchange surface by particulate matter from or formed in the cooling water including, but not limited to, constituents such as calcium carbonate, calcium phosphate, magnesium silicate, silica, manganese oxides, aluminum phosphates, silt, and sand.

The term "corrosion fouling" refers to fouling of a heat exchange surface by corrosion-formed deposits, such as primarily metal oxides, which may be formed in situ or by breakage and re-deposition from elsewhere in the system.

For example, the evaporation of cooling water can lead to the concentration of salts (e.g., calcium, sodium, magnesium) in the cooling water stream recycled through the system. These salts can form scaling deposits on surfaces of heat exchanger contacted by the cooling water. As another example, if the cooling water contains organic materials and microbes, biofilms can deposit on surfaces of heat exchanger contacted by the cooling water. As yet a further example, corrosion products can develop within the cooling water stream, e.g., due to the oxidation of metal component (e.g., iron, aluminum, and/or zinc). These corrosion products can also deposit on surfaces of heat exchanger contacted by the cooling water. Independent of the mechanism or cause of the fouling, a build-up of a barrier layer on the surfaces of heat exchanger contacted by the cooling water can reduce the efficacy of thermal transfer through the heat exchanger.

To help reduce or eliminate potential fouling conditions in the cooling water stream passing through the heat transfer network, one or more chemicals may be added to the cooling water to inhibit formation and/or deposition of foulants. Example chemical additives that may be injected into the cooling water include, but are not limited to, polymers (dispersants and scale inhibitors), organophosphorus compounds such as phosphinosuccinic oligomer (PSO, scale and corrosion inhibitor), zinc (corrosion inhibitor), orthophosphate (corrosion inhibitor), polyphosphates (scale and corrosion inhibitors), biocides, a dispersants, and combinations thereof. Additionally or alternatively, one or more chemical additives may be injected into the cooling water to adjust the pH of the cooling water. Examples of pH adjusting control agents include mineral acids, organic acids, and inorganic bases.

The presently disclosed method and system can be scaled to accommodate more than two make-up water streams from independent water sources. In some aspects, the system includes three, four, five, or six make-up water inlet streams. Each inlet stream can be connected to a single cooling tower inlet pipe without passing through a make-up water holding tank. Alternatively, each inlet stream could be fed independently into the cooling tower.

The cooling system and associated treatment program will be optimized and adjusted for discrete changes in the ratios of the inlet make-up water streams using a pre-determined look up table that is stored in the controller.

Each measured parameter may have a pre-determined setpoint or operating range in which the system should be maintained. In some aspects, the controller stores a conductivity, pH, or corrosion setpoint.

This process of measuring the make-up water properties and adjusting flow or additive dosage can be accomplished in real-time using either cloud based or on-site PLC calculations using the Nalco Cooling Water Optimizer to provide updated, real-time or near real-time adjustments to the local PLC.

The dosage of the treatment chemicals can depend on the ratio of the incoming make-up water streams and the resultant water profile.

Figure 5:
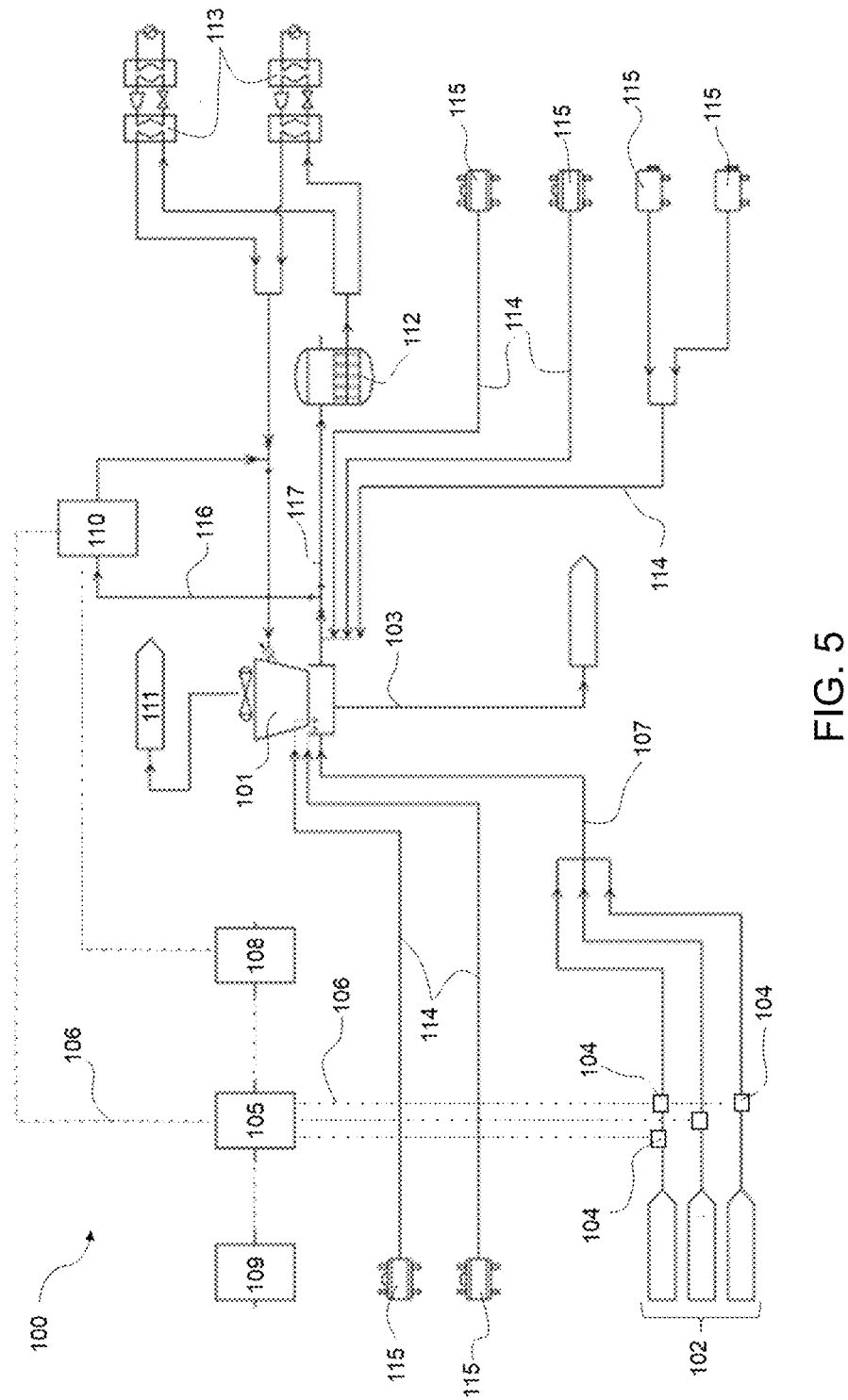
FIG. 5 shows an embodiment of a cooling tower system.

Referring to FIG. 5, an embodiment of a cooling tower system 100, is shown. The system 100 includes a cooling tower 101; at least two make-up water inlet streams 102 configured to supply water to the cooling tower 101; a blowdown stream 103 configured to remove water from the cooling tower 101; at least one sensor 104 monitoring water in each of the make-up water inlet streams 102; and a controller 105 operably connected to the at least one sensor 104.

The at least two make-up water inlet streams 102 are connected to a pipe 107 that is connected to the cooling tower 101, and the pipe 107 carries water from the at least two make-up water inlet streams 102 into the cooling tower 101. Although the make-up streams are not required to be connected to a pipe carrying water to the cooling tower, but can be directly connected to the cooling tower to deliver the make-up water.

The cooling tower system may include a distributed control system 108 operably connected to the controller. The PLC controller 105 receives inputs from the makeup water stream sensors 104. The PLC controller is pre-programmed utilizing the Optimizer 109 performance data of any combination of the makeup water streams to create the virtual composite stream. The PLC controller 105 will locate the appropriate control parameters according to the virtual composite stream makeup ratios. The control parameters are exported to the controller 110 and the distributed control system 108 to activate the chemical pumps and blowdown valves. The control parameters do not have to be exported to all locations, only those which control the blowdown valve and chemical pumps.

In a cooling tower, water is lost to evaporation 111 and make-up water must be added. Fluid travels through line 117 through a filter 112 on its way to heat exchangers 113. Then the fluid is returned to the cooling tower 101. The fluid in line 117 can be treated with chemicals by injecting agents through lines 114. The make-up water lines 102 can also be treated with chemical additives by injecting through lines 114 directly into the make-up water line 102 or into the cooling tower 101. Chemicals can be stored in tanks 115 and pumped into the target line.

Samples of fluid in line 117 can be drawn out using line 116 and analyzed using a water analysis unit 110. The properties of the fluid in line 117 can be transmitted to the controller 110 where the properties can be compared to stored set points. The controller 110 then determines whether adjustments are to be made in make-up water flow rates or chemical additive dosage amounts. The makeup water sensors are reported to PLC controller 105 which exports the corresponding control parameters to controller 110 based on the makeup ratios of the composite stream.

In certain aspects, a control system includes a monitoring and controlling unit that comprises a controller and a plurality of sensors. Each of the plurality of sensors can be in communication with the controller. For example, if the unit comprises five sensors, each of the five sensors can be in communication with the controller. In certain aspects, the controller can be attached to a skid, or other type of support member, to allow for mobility.

A method of controlling cooling water treatment is also provided. The method includes receiving data from at least one sensor monitoring water in at least two make-up water inlet streams configured to supply water to a cooling tower; and creating a virtual make-up stream from the data received from the at least one sensor.

The virtual make-up stream refers to a stream comprised of certain proportions of the make-up water inlet streams. Based on the properties of each make-up water stream such as flow rate and conductivity, the properties of a mixed stream can be predicted if two or more make-up streams are mixed.

Data received sensors on the make-up water inlet streams is analyzed and a virtual stream created. Dosage of chemical additives and blowdown flow rates can be adjusted based on the properties of the virtual stream.

In some aspects, the method may include adjusting the blowdown and CoC (Cycles of Concentration) of the cooling system based on the changes in the make-up water streams quality.

As used herein, the term "controller" refers to a manual operator or an electronic device having components, such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components.

The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, and/or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components, such as a signal conditioner or system monitor, may be included to facilitate signal transmission and signal-processing algorithms.

In certain aspects, the controller includes hierarchy logic to prioritize any measured or predicted properties associated with system parameters. For example, the controller may be programmed to prioritize system pH over conductivity, or vice versa. It should be appreciated that the object of such hierarchy logic is to allow improved control over the system parameters and to avoid circular control loops.

In some embodiments, the monitoring and controlling unit and method associated therewith includes an automated controller. In some embodiments, the controller is manual or semi-manual. For example, when the system includes one or more datasets received from various sensors in the system, the controller may either automatically determine which data points/datasets to further process or an operator may partially or fully make such a determination. A dataset for an industrial body of water, for instance, may include variables or system parameters such as ORP, dissolved oxygen (DO), conductivity, pH, turbidity, concentrations of certain chemicals, such as biocides, scale inhibitors, acids, bases, levels of ions (e.g., determined empirically, automatically, fluorescently, electrochemically, colorimetrically, measured directly, calculated), temperature, pressure, flow rate, total dissolved or suspended solids, etc. Such system parameters are typically measured with any type of suitable data capturing equipment, such as sensors designed specifically for these parameters, e.g., pH sensors, ion analyzers, temperature sensors, thermocouples, pressure sensors, corrosion probes, and/or any other suitable device or sensor. Data capturing equipment is in communication with the controller and, according to some embodiments, may have advanced functions (including any part of the control algorithms described herein) imparted by the controller.

The monitoring and controlling unit may comprise a plurality of sensors, which are capable of analyzing the water and transmitting data regarding the water to the controller. The plurality of sensors can comprise, for example, sensors for measuring conductivity, pH, ORP, biocide concentration, turbidity, temperature, flow, and DO in the water. The monitoring and controlling unit may comprise any of these sensors, all of these sensors, a combination of two or more of these sensors, one or more additional sensors not specifically mentioned here, and the sensors may be in communication with the controller. Other types of sensors contemplated by the present disclosure include, but are not limited to, oil in water sensors, total dissolved solids sensors, and total suspended solids sensors.

The presently disclosed monitoring and controlling system comprises, in certain embodiments, one or more chemical injection pumps. Each chemical injection pump may be in fluid communication with a storage device. Each storage device may comprise one or more chemicals and the chemical injection pumps may transport those chemicals into the body of water. In some embodiments, the chemical injection pump comprises the storage device. The chemical injection pumps may be in communication with the controller in any number of ways, such as through any combination of wired connection, a wireless connection, electronically, cellularly, through infrared, satellite, or according to any other types of communication networks, topologies, protocols, standards and more. Accordingly, the controller can send signals to the pumps to control their chemical feed rates.

In certain embodiments, the monitoring and controlling system is implemented to have the plurality of sensors provide continuous or intermittent feedback, feed-forward, and/or predictive information to the controller, which can relay this information to a relay device, such as the Nalco Global Gateway, which can transmit the information via cellular communications to a remote device, such as a cellular telephone, computer, and/or any other device that can receive cellular communications. This remote device can interpret the information and automatically send a signal (e.g. electronic instructions) back, through the relay device, to the controller to cause the controller to make certain adjustments to the output of the pumps. The information can also be processed internally by the controller and the controller can automatically send signals to the pumps to adjust the amount of chemical injection, for example. Based upon the information received by the controller from the plurality of sensors or from the remote device, the controller may transmit signals to the various pumps to make automatic, real-time adjustments, to the amount of chemical that the pumps are injecting into the water.

Alternatively, an operator of the remote device that receives cellular communications from the controller can manually manipulate the pumps through the remote device. The operator may communicate instructions, through the remote device, cellularly or otherwise, to the controller and the controller can make adjustments to the rate of chemical addition of the chemical injection pumps. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the water by one or more of the injection pumps, or any combination of the foregoing. The controller and/or the remote device is also capable of making any of the foregoing adjustments or modifications automatically without the operator actually sending or inputting any instructions. Preset parameters or programs are entered into the controller or remote device so that the controller or remote device can determine if a measured property is outside of an acceptable range. Based on the information received by the plurality of sensors, the controller or remote device can make appropriate adjustments to the pumps or send out an appropriate alert.

In certain embodiments, the remote device or controller can include appropriate software to receive data from the plurality of sensors and determine if the data indicates that one or more measured properties of the water are within, or outside, an acceptable range. The software can also allow the controller or remote device to determine appropriate actions that should be taken to remedy the property that is outside of the acceptable range. For example, if the measured pH is above the acceptable range, the software allows the controller or remote device to make this determination and take remedial action, such as alerting a pump to increase the flow of an acid into the body of water.

The monitoring and controlling system and/or controller disclosed herein can incorporate programming logic to convert analyzer signals from the plurality of sensors to pump adjustment logic and, in certain embodiments, control one or more of a plurality of chemical injection pumps with a unique basis. Non-limiting, illustrative examples of the types of chemical injection pumps that can be manipulated include chemical injection pumps responsible for injecting biocides, scale inhibitors, friction reducers, acids, bases, sulfites, oxygen scavengers, and any other type of chemical that could prove to be useful in the particular aqueous industrial system. Particular examples of biocides, scale inhibitors, friction reducers, acids, bases, sulfites, and oxygen scavengers are all well-known in the art and all examples of such chemicals are within the scope of the present disclosure.

The sensors disclosed herein are operable to sense and/or predict a property associated with the water or system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value to determine if the input numerical value is within an optimum range, generate an output numerical value, convert the output numerical value into an output signal, e.g., an electrical signal, and transmit the output signal to a receiver, such as a pump incorporating such receiver capabilities or a remote device, such as a computer or cellular telephone, incorporating receiver capabilities. The receiver receives the output signal and either alerts an operator to make adjustments to flow rates of the pumps, or the receiver can be operable to cause a change in a flow rate of the pumps automatically, if the output numerical value is not within the acceptable range for that property.

The method is optionally repeated for a plurality of different system parameters, where each different system parameter has a unique associated property, or, alternatively, all system parameters can be analyzed concurrently by the plurality of sensors.

Data transmission of measured parameters or signals to chemical pumps, alarms, remote monitoring devices, such as computers or cellular telephones, or other system components is accomplished using any suitable device, and across any number of wired and/or wireless networks, including as examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used.

As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

In some embodiments, system parameter information is received from the system and archived. In certain embodiments, system parameter information is processed according to a timetable or schedule. In some embodiments, system parameter information is immediately processed in real-time or substantially real-time. Such real-time reception may include, for example, "streaming data" over a computer network.

The presently disclosed methods can be used in a variety of applications. For example, the oxidizing composition can be used as a sacrificial oxidant to reduce demand on the converted chlorine dioxide molecule, in non-biocidal applications, where chlorite is a limitation, this approach may enable use of chlorine dioxide, in fresh-water or influent water treatment, in waste-water treatment where certain species of pollutants may require oxidation, in water streams that have a chemically reducing environment, to create an aerobic environment in water streams that have a significant anaerobic environment, in water systems where a higher dose of oxidizing biocide can have a detrimental impact but could benefit with a lower dose, and in open recirculating cooling water systems in the food and beverage industry, papermaking processes, and mining industries.

EXAMPLES

Example 1

The scenario tested for this invention comprised of three makeup water streams with two sensors in each makeup water stream (flow and conductivity). The makeup water sensors are connected to the PLC controller which accepts the flow rate and conductivity inputs for each individual makeup stream. A virtual composite stream is generated and control parameters for this specific virtual composite stream are output to the distributed control screen and cooling tower controller. The distributed control screen controls the blowdown valve and the cooling tower controller controls the chemical pumps and conductivity setpoint.

FIG. 1 illustrates the flowrates changing from the first stream to the second and also a blending condition. For this phase of the experiment, we verified the blend ratio modification and the chemical set point modification as well. It clearly illustrates as the virtual composite stream fluctuates based on loading and cooling tower level, the programming will output the corresponding control parameters to protect the system.

Figure 2:
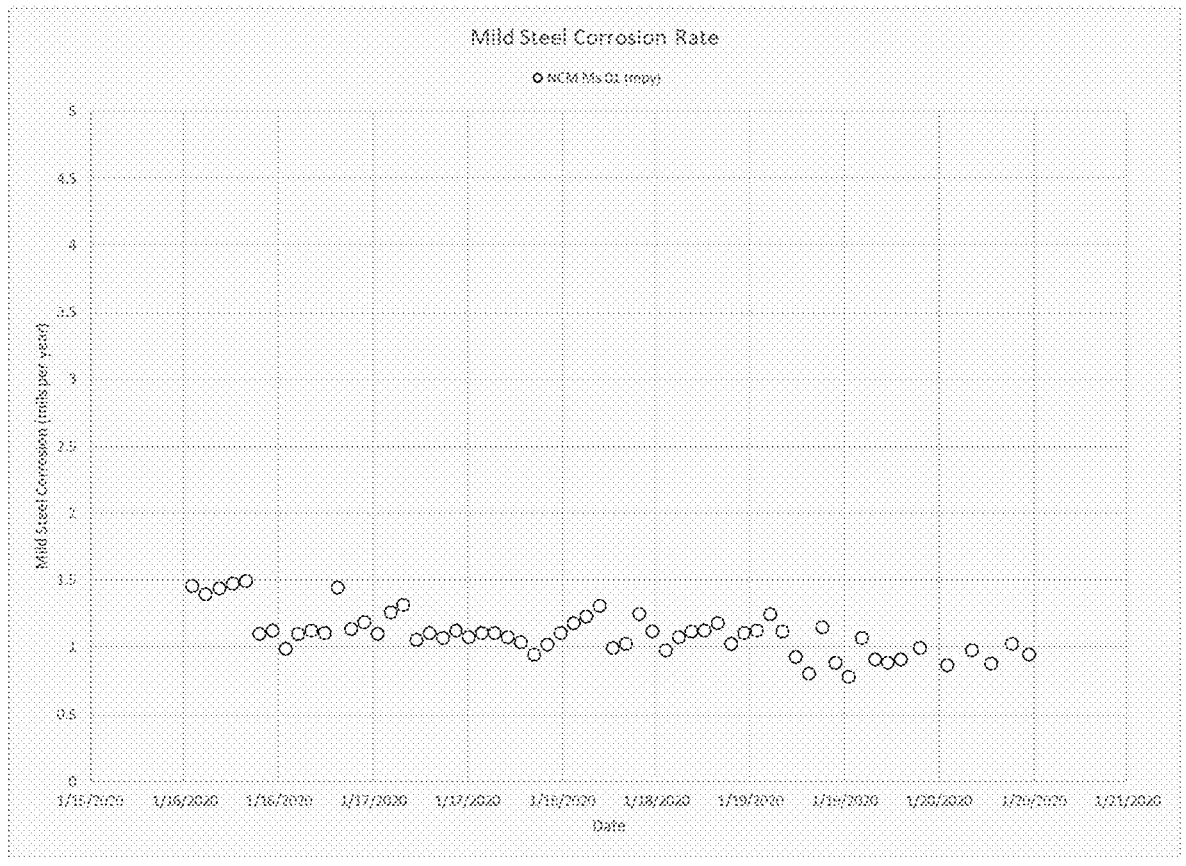
FIG. 2 shows mild steel corrosion rates.
Figure 3:
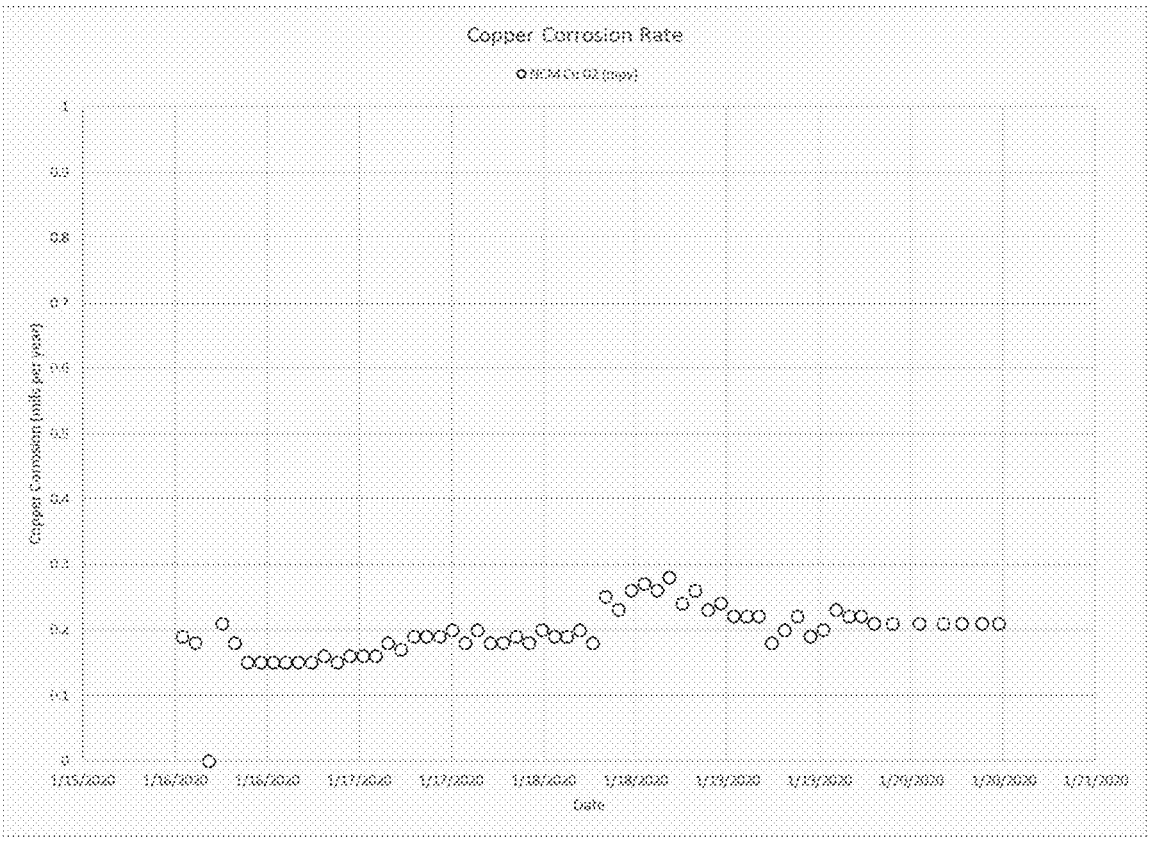
FIG. 3 shows copper corrosion rates.

As noted is FIG. 2 and FIG. 3, the instantaneous mild steel corrosion (FIG. 2) and copper corrosion (FIG. 3) rates remain in spec. The corrosivity of the makeup streams affects the instantaneous corrosion rates of the system water, but because the control can be modified based on makeup ratio, the system remains protected.

Figure 4:
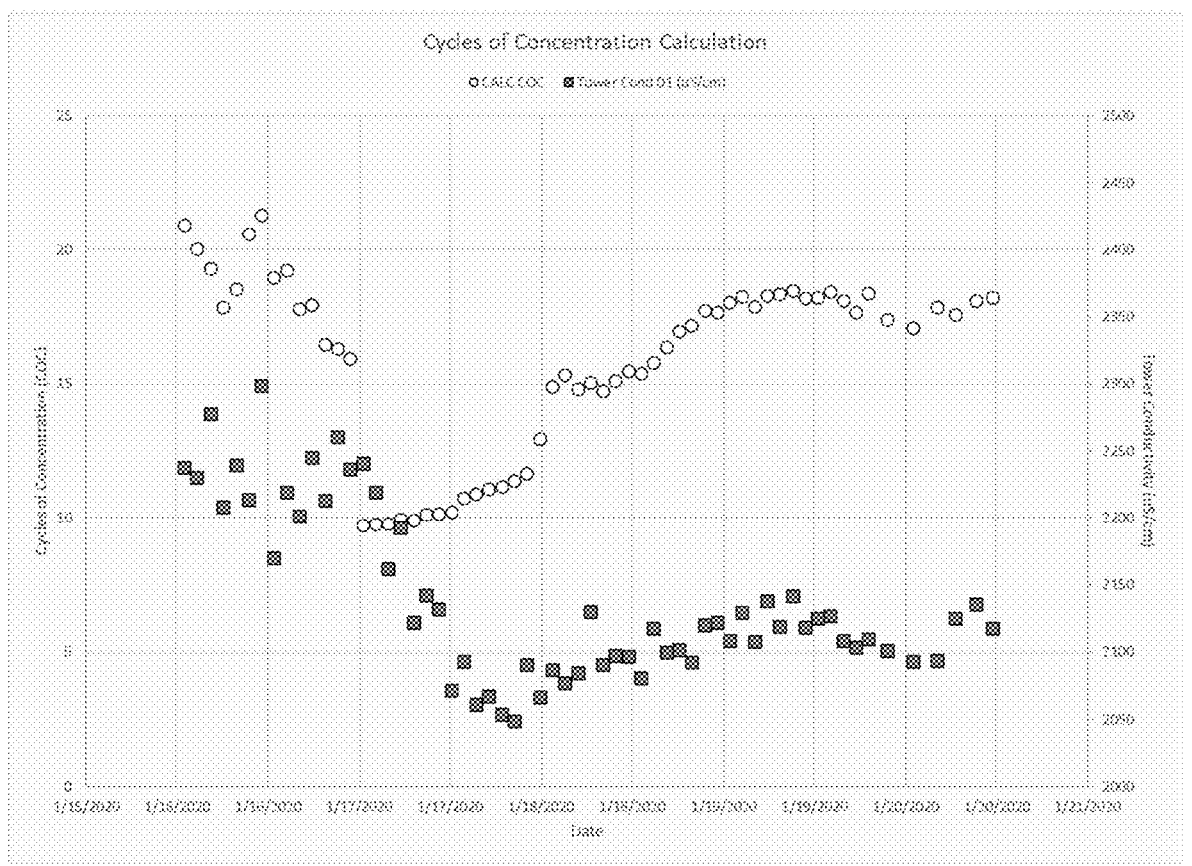
FIG. 4 shows cycles of concentration calculation.

The cycles of concentration and tower system conductivity are illustrated in FIG. 4. This shows the cycles of concentration varying because your makeup water virtual composite stream is constantly changing the conductivity, results in higher or lower CoC. The decrease in tower conductivity is to protect the system based on the makeup water ratio. As more corrosive water was introduced into the system, the conductivity was reduced to protect the system.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a sensor" is intended to include "at least one sensor" or "one or more sensors."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A cooling tower system, comprising:

a cooling tower;

at least two make-up water conduits configured to supply make-up water from at least two make-up water inlet streams to cooling water within the cooling tower;

a blowdown stream configured to remove cooling water from the cooling tower;

at least one sensor monitoring water in each of the at least two make-up water inlet streams; and a controller operably connected to the at least one sensor in each of the at least two make-up water inlet streams;

wherein the controller is configured to:

receive data from the at least one sensor in each of the at least two make-up water inlet streams, create a virtual make-up stream, which is a mixed stream of the at least two make-up water inlet streams, from the data received from the at least one sensor in each of the at least two make-up water inlet streams, and control dosage of chemical additives to cooling water and blowdown flow rates from the cooling tower based on predicted flow rate and conductivity of the virtual make-up stream.

2. The system of claim 1, wherein the at least two make-up water inlet streams comprises three make-up water inlet streams.

3. The system of claim 1, wherein the at least two make-up water conduits are connected to a pipe that is connected to the cooling tower, and the pipe carries make-up water from the at least two make-up water inlet streams into the cooling tower.

4. The system of claim 1, wherein the at least one sensor in each of the at least two make-up water inlet streams is a conductivity sensor.

5. The system of claim 1, wherein the at least one sensor in each of the at least two make-up water inlet streams is a flow sensor.

6. The system of claim 1, wherein each make-up water inlet stream is monitored by at least two sensors, and wherein the at least two sensors comprise a conductivity sensor and a flow sensor.

7. The system of claim 1, wherein the controller stores a conductivity set-point.

8. The system of claim 1, wherein the system does not include a make-up water holding tank configured to supply make-up water to the cooling tower.

9. The system of claim 1, further comprising one or more chemical injection pumps configured to inject a chemical additive into the make-up water.

10. The system of claim 9, further comprising a distributed control system operably connected to the controller and configured to manipulate the one or more chemical injection pumps.

11. The system of claim 9, wherein the chemical additive is injected into the cooling tower.

12. The system of claim 9, wherein the chemical additive is selected from the group consisting of a scale inhibitor, a corrosion inhibitor, a biocide, a dispersant, and any combination thereof.

13. A cooling tower system, comprising:

a cooling tower;

at least two make-up water conduits connected to a pipe configured to supply make-up water from at least two make-up water inlet streams to cooling water within the cooling tower;

a blowdown stream configured to remove cooling water from the cooling tower;

a conductivity sensor and a flow sensor monitoring water in each of the at least two make-up water inlet streams; and a controller operably connected to the conductivity sensor and the flow sensor;

wherein the controller is configured to:

receive data from conductivity sensor and the flow sensor, create a virtual make-up stream, which is a mixed stream of the at least two make-up water inlet streams, from the data received from the conductivity sensor and the flow sensor, and control dosage of chemical additives to cooling water and blowdown flow rates from the cooling tower based on predicted flow rate and conductivity of the virtual make-up stream.

14. The system of claim 13, wherein the at least two make-up water inlet streams comprises three make-up water inlet streams.

15. The system of claim 13, further comprising one or more chemical injection pumps configured to inject a chemical additive into the make-up water.

16. The system of claim 15, further comprising a distributed control system operably connected to the controller and configured to manipulate the one or more chemical injection pumps.

* * * * *